United States Patent
Batson et al.

(10) Patent No.: US 8,255,636 B2
(45) Date of Patent: *Aug. 28, 2012

(54) TWO-HOP SOURCE SNOOP BASED MESSAGING PROTOCOL

(75) Inventors: Brannon J. Batson, Brooklyn, NY (US); Benjamin Tsien, San Jose, CA (US); William A. Welch, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 692 days.

This patent is subject to a terminal disclaimer.

(21) Appl. No.: 12/370,813

(22) Filed: Feb. 13, 2009
(Under 37 CFR 1.47)

(65) Prior Publication Data
US 2009/0198913 A1 Aug. 6, 2009

Related U.S. Application Data

(63) Continuation of application No. 11/332,028, filed on Jan. 13, 2006, now Pat. No. 7,512,741, which is a continuation of application No. 11/331,301, filed on Jan. 11, 2006, now abandoned.

(51) Int. Cl.
*G06F 12/00* (2006.01)
*H04L 12/00* (2006.01)
(52) U.S. Cl. ........ 711/141; 711/145; 370/329; 370/409; 709/209
(58) Field of Classification Search ........................ None
See application file for complete search history.

(56) References Cited

U.S. PATENT DOCUMENTS

| | | | |
|---|---|---|---|
| 6,009,488 A | 12/1999 | Kavipurapu | |
| 6,018,791 A | 1/2000 | Arimilli et al. | |
| 6,922,756 B2 | 7/2005 | Hum et al. | |
| 6,950,438 B1 | 9/2005 | Owen et al. | |
| 2002/0009095 A1 | 1/2002 | Van Doren et al. | |
| 2005/0160132 A1 | 7/2005 | Van Doren et al. | |
| 2005/0160237 A1 | 7/2005 | Tierney et al. | |
| 2005/0262250 A1 | 11/2005 | Batson et al. | |
| 2006/0294525 A1* | 12/2006 | Rowlands | 718/104 |
| 2007/0022252 A1 | 1/2007 | Cen | |

OTHER PUBLICATIONS

U.S. Appl. No. 11/332,057, filed Jan. 13, 2006, entitled "A Two-Hop Source Snoop Based Cache Coherence Protocol," by Brannon J. Batson.
U.S. Appl. No. 11/330,977, filed Jan. 11, 2006, entitled "A Two-Hop Source Snoop Based Cache Coherence Protocol," by Brannon J. Batson.

* cited by examiner

*Primary Examiner* — Kaushikkumar Patel
(74) *Attorney, Agent, or Firm* — Trop, Pruner & Hu, P.C.

(57) ABSTRACT

A messaging protocol that facilitates a distributed cache coherency conflict resolution in a multi-node system that resolves conflicts at a home node. The protocol may perform a method including supporting at least three protocol classes for the messaging protocol, via at least three virtual channels provided by a link layer of a network fabric coupled to the caching agents, wherein the virtual channels include a first virtual channel to support a probe message class, a second virtual channel to support an acknowledgment message class, and a third virtual channel to support a response message class.

19 Claims, 3 Drawing Sheets

TWO-HOP SOURCE SNOOP BASED MESSAGING PROTOCOL

This application is a continuation of U.S. patent application Ser. No. 11/332,028, filed Jan. 13, 2006 now U.S. Pat. No. 7,512,741, now entitled "A TWO-HOP SOURCE SNOOP BASED MESSAGING PROTOCOL," and which is a continuation of Ser. No. 11/331,301, filed Jan. 11, 2006, now abandoned, and entitled "A TWO-HOP SOURCE SNOOP BASED MESSAGING PROTOCOL," the contents of which are hereby incorporated by reference.

RELATED APPLICATIONS

Application Ser. No. 11/332,057, filed Jan. 13, 2006, now pending, entitled "A TWO-HOP SOURCE SNOOP BASED CACHE COHERENCE PROTOCOL," which is a continuation of application Ser. No. 11/330,977, filed Jan. 11, 2006, now abandoned, and entitled "A TWO-HOP SOURCE SNOOP BASED CACHE COHERENCE PROTOCOL";

Application Ser. No. 10/833,963, filed Apr. 27, 2004, now pending, and entitled "A TWO-HOP CACHE COHERENCY PROTOCOL";

Application Ser. No. 10/833,965, filed Apr. 27, 2004, now pending, and entitled "A MESSAGING PROTOCOL"; and U.S. Pat. No. 6,922,756, issued Jul. 26, 2005 entitled "FORWARD STATE FOR USE IN CACHE COHERENCY IN A MULTI-NODE SYSTEM".

FIELD OF THE INVENTION

The invention relates to high speed point to point interconnect links. More particularly, the invention relates to how a cache coherence protocol may be applied for implementing a coherent memory system with an interconnect architecture utilizing point-to-point links. For example, the described cache coherence protocol facilitates and supports systems ranging from a single-socket up through and greater than sixty four socket segments.

BACKGROUND

When an electronic system includes multiple cache memories, the validity of the data available for use must be maintained. This is typically accomplished by manipulating data according to a cache coherency protocol. As the number of caches and/or processors increases, the complexity of maintaining cache coherency also increases.

When multiple components (e.g., a cache memory, a processor) request the same block of data the conflict between the multiple components must be resolved in a manner that maintains the validity of the data. Current cache coherency protocols typically have a single component that is responsible for conflict resolution. However, as the complexity of the system increases, reliance on a single component for conflict resolution can decrease overall system performance.

A messaging protocol defines a set of allowed messages between agents, such as, caching and home agents. Likewise, the messaging protocol allows for a permissive set of valid message interleavings. However, the messaging protocol is not equivalent to a cache coherence protocol. In contrast, the messaging protocol serves the purpose of establishing the "words and grammar of the language". Consequently, the messaging protocol defines the set of messages that caching agents must send and receive during various phases of a transaction. In contrast to a messaging protocol, an algorithm (cache coherence protocol) is applied to a home agent for coordinating and organizing the requests, resolving conflicts, and interacting with caching agents.

There are two basic schemes for providing cache coherence, snooping (now often called Symmetric MultiProcessing SMP) and directories (often called Distributed Shared Memory DSM). The fundamental difference has to do with placement and access to the meta-information, that is, the information about where copies of a cache line are stored.

For snooping caches the information is distributed with the cached copies themselves, that is, each valid copy of a cache line is held by a unit that must recognize its responsibility whenever any node requests permission to access the cache line in a new way. Someplace—usually at a fixed location—is a repository where the data is stored when it is uncached. This location may contain a valid copy even when the line is cached. However, the location of this node is generally unknown to requesting nodes—the requesting nodes simply broadcast the address of a requested cache line, along with permissions needed, and all nodes that might have a copy must respond to assure that consistency is maintained, with the node containing the uncached copy responding if no other (peer) node responds.

For directory-based schemes, in addition to a fixed place where the uncached data is stored, there is a fixed location, the directory, indicating where cached copies reside. In order to access a cache line in a new way, a node must communicate with the node containing the directory, which is usually the same node containing the uncached data repository, thus allowing the responding node to provide the data when the main storage copy is valid. Such a node is referred to as the Home node.

The directory may be distributed in two ways. First, main storage data (the uncached repository) is often distributed among nodes, with the directory distributed in the same way. Secondly, the meta-information itself may be distributed, keeping at the Home node as little information as whether the line is cached, and if so, where a single copy resides. SCI, for example, uses this scheme, with each node that contains a cached copy maintaining links to other nodes with cached copies, thus collectively maintaining a complete directory.

Snooping schemes rely on broadcast, because there is no single place where the meta-information is held, so all nodes must be notified of each query, each node being responsible for doing its part to assure that coherence is maintained. This includes intervention messages, informing the Home node not to respond when another node is providing the data.

Snooping schemes have the advantage that responses can be direct and quick, but do not scale well because all nodes are required to observe all queries. Directory schemes are inherently more scalable, but require more complex responses, often involving three nodes in point-to-point communications.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

Techniques for a messaging protocol are described. For example, in one embodiment, this messaging protocol is one example of a two-hop protocol that utilizes a cache coherence protocol from referenced application Ser. No. 11/332,057, with attorney docket number P22376C that is applied for implementing a coherent memory system using agents in a network fabric. One example of a network fabric may comprise either or all of: a link layer, a protocol layer, a routing layer, a transport layer, and a physical layer. The fabric facilitates transporting messages from one protocol (home or caching agent) to another protocol for a point to point network. In one aspect, the figure depicts a cache coherence protocol's abstract view of the underlying network.

Figure 1:
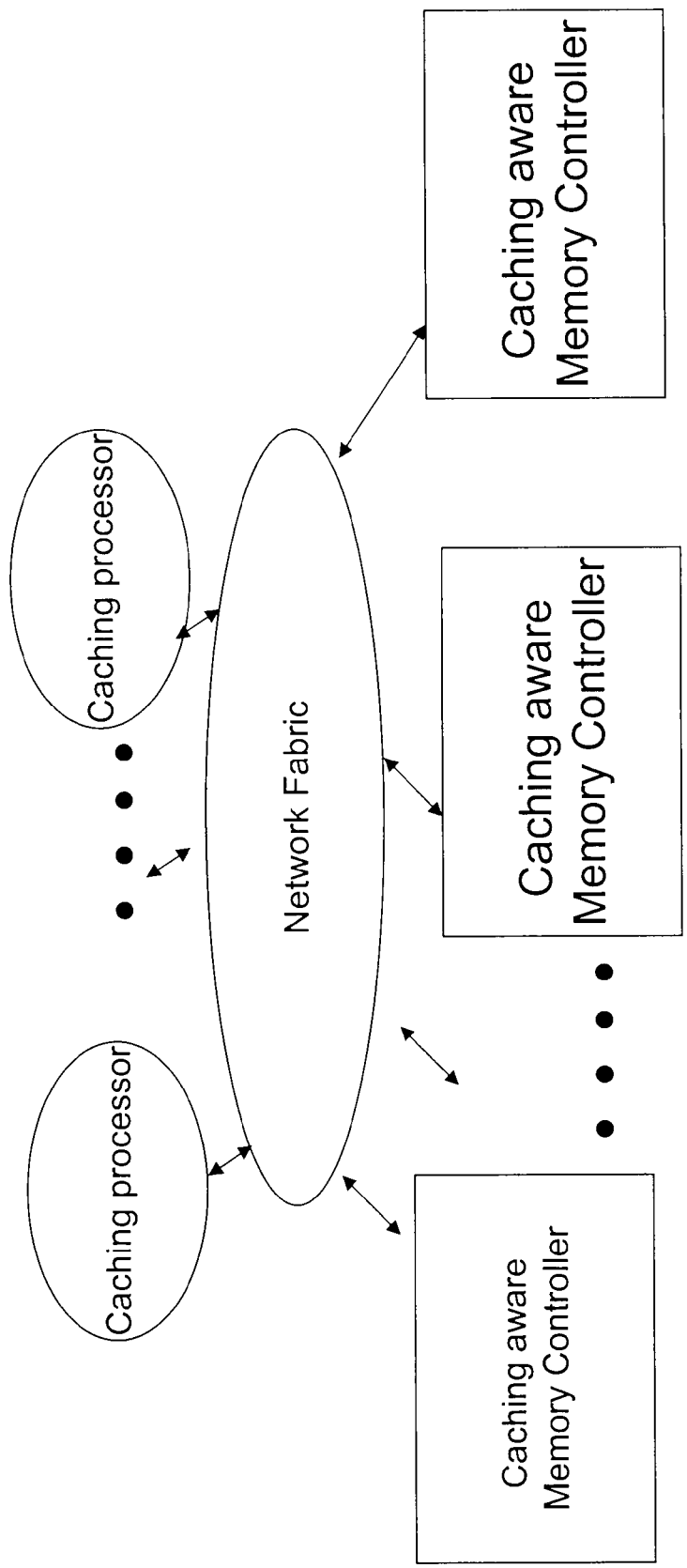
FIG. 1 is a protocol architecture as utilized by one embodiment.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. In one embodiment, the claimed subject matter utilizes a point-to-point (pTp) architecture that supports a layered protocol scheme, FIG. 1 illustrates one example of a cache coherence protocol's abstract view of the underlying network. In one embodiment, the claimed subject matter may be utilized for an architecture that depicts a plurality of caching agents and home agents coupled to a network fabric (see FIG. 1). For example, the network fabric adheres to a layered protocol scheme and comprised of: a physical layer, a link layer, a routing layer, a transport layer and a protocol layer (as depicted in connection with FIG. 2). The fabric facilitates transporting messages from one protocol to another protocol for a point to point network. In one aspect, the figure depicts a cache coherence protocol's abstract view of the underlying network.

FIG. 1 is a high level, simplified abstraction of a protocol architecture as utilized by one embodiment. The fabric facilitates transporting messages from one protocol (caching processor or caching aware memory controller) to another protocol for a point to point network. In one aspect, the figure depicts a cache coherence protocol's abstract view of the underlying network.

As previously noted, the claimed subject matter incorporates several innovative features from the related applications. For example, in one embodiment, the claimed subject matter incorporates the Forward state (F-state) from U.S. Pat. No. 6,922,756 and entitled "Forward State for Use in Cache Coherency in a Multi-Node System". Likewise, the claimed subject matter utilizes conflict tracking at the home agent for various situations, which is discussed in connection with U.S. patent application Ser. No. 10/833,963, with attorney docket number P15925, and entitled "A TWO-HOP CACHE COHERENCY PROTOCOL". Finally, in one embodiment, the claimed subject matter utilizes various the disclosed messaging protocol to form a part of a coherence protocol as described in application Ser. No. 11/332,057, with attorney docket number P22376C. However, various features of the related applications are utilized throughout this application and we will discuss them as needed. The preceding examples of references were merely illustrative.

In one embodiment, the claimed subject matter supports in-order home channels. For example, a in-order home channel may be between the same pair of nodes in a similar direction to insure that a first message from a requesting node that was sent before a second message from the same requesting node is received in that order (first message is received first by the receiving node and the second message is subsequently received by the receiving node).

The discussion that follows is provided in terms of nodes within a multi-node system. In one embodiment, a node includes a processor having an internal cache memory, an external cache memory and/or an external memory. In an alternate embodiment, a node is an electronic system (e.g., computer system, mobile device) interconnected with other electronic systems. Other types of node configurations can also be used.

In this embodiment, the caching agent:

1) makes read and write requests into coherent memory space.

2) hold cached copies of pieces of the coherent memory space.

3) supplies the cached copies to other caching agents.

Also, in this embodiment, the home agent guards a piece of the coherent memory space and performs the following duties:

1) tracking cache state transitions from caching agents.

2) managing conflicts amongst caching agents.

3) interfacing to a memory, such as, a dynamic random access memory (DRAM).

4) providing data and/or ownership in response to a request (if the caching agent has not responded).

For example, the cache coherence protocol depicts a protocol for the home agent that allows the home agent to sink all control messages without a dependency on the forward progress of any other message.

Figure 2:
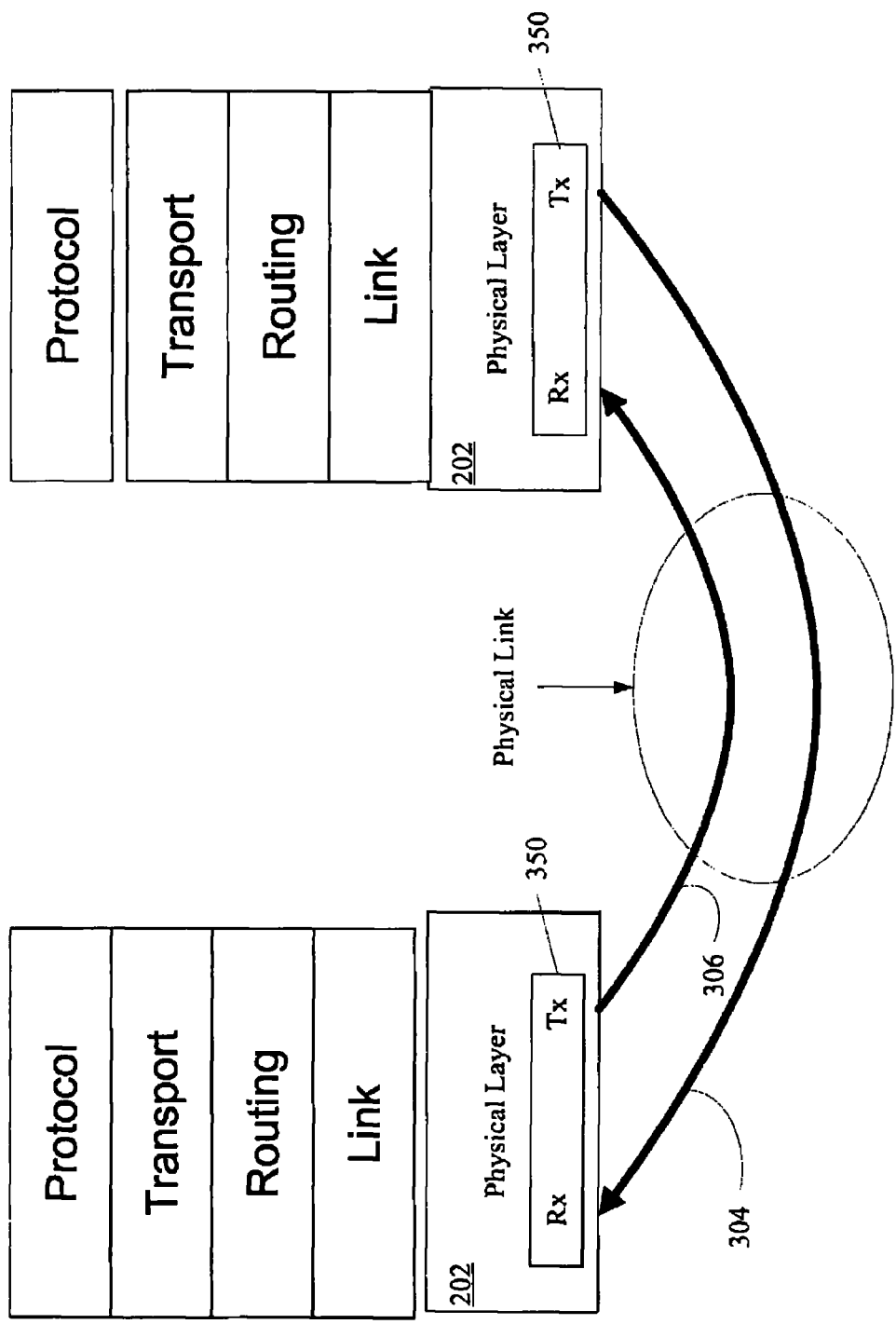
FIG. 2 is a block diagram of an apparatus for a physical interconnect utilized in accordance with the claimed subject matter.

FIG. 2 is a block diagram of an apparatus for a physical interconnect utilized in accordance with the claimed subject matter. In one aspect, the apparatus depicts a physical layer for a cache-coherent, link-based interconnect scheme for a processor, chipset, and/or IO bridge components. For example, the physical interconnect may be performed by each physical layer of an integrated device. Specifically, the physical layer provides communication between two ports over a physical interconnect comprising two unidirectional links. Specifically, one uni-directional link 304 from a first transmit port 350 of a first integrated device to a first receiver port 350 of a second integrated device. Likewise, a second uni-directional link 306 from a first transmit port 350 of the second integrated device to a first receiver port 350 of the first integrated device. However, the claimed subject matter is not limited to two uni-directional links. One skilled in the art appreciates the claimed subject matter supports any known signaling techniques, such as, bi-directional links, etc.

Figure 3:
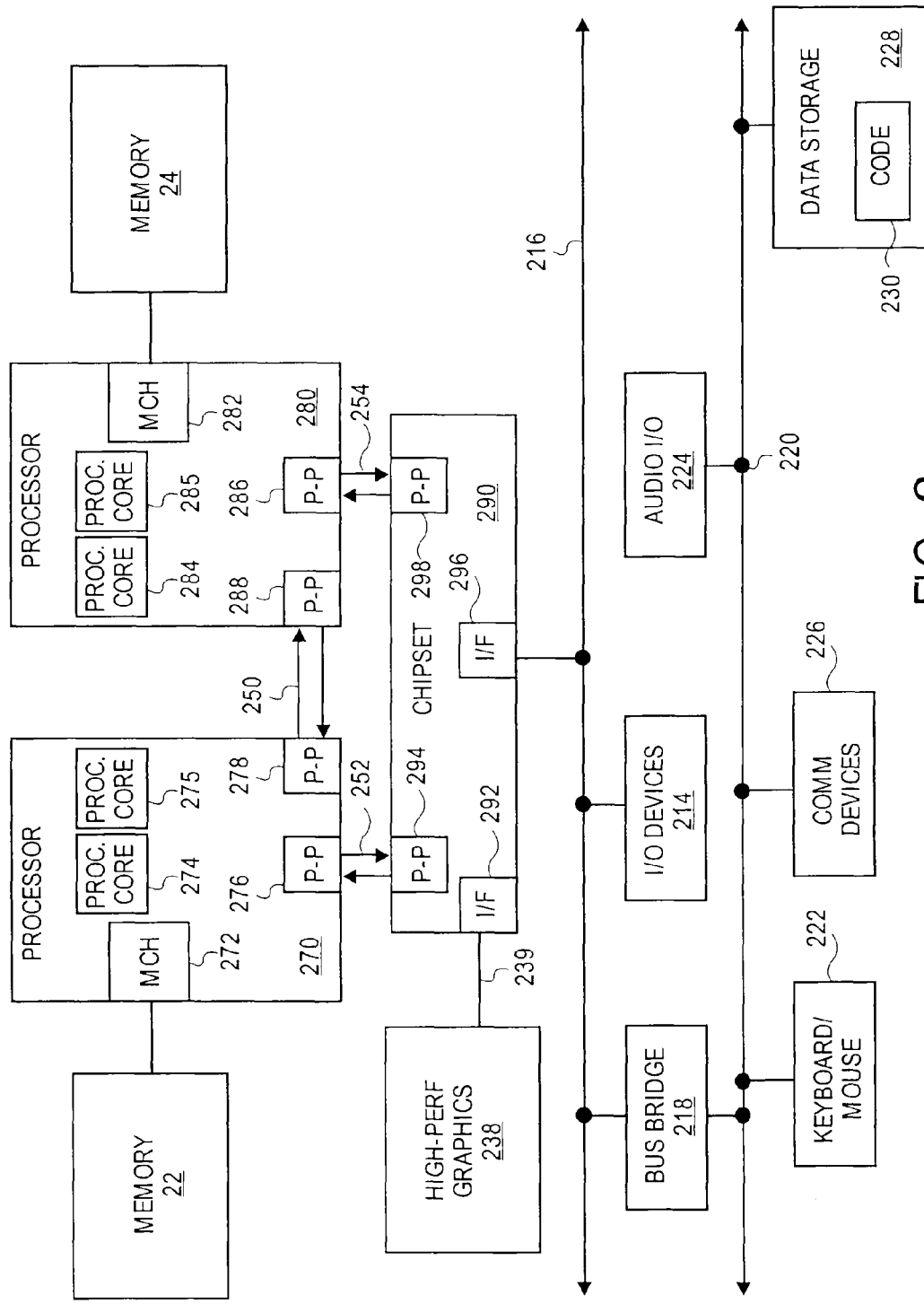
FIG. 3 depicts a system as utilized by one embodiment in accordance with the claimed subject matter.

FIG. 3 is a system as utilized by one embodiment of the claimed subject matter. In particular, FIG. 3 shows a system where processors, memory, and input/output devices are interconnected by a number of point-to-point interfaces.

The system of FIG. 3 may also include several processors, of which only two, processors 270, 280 are shown for clarity. Processors 270, 280 may each include a memory controller or a local memory controller hub (MCH) 272, 282 to connect with memory 22, 24. In one embodiment, the memories 22 and 24 are DRAM and/or a cache memory. In one embodiment, the cache memory could be any level of cache memory used by a processor. In one embodiment, processors 270, 280 may exchange data via a point-to-point (PtP) interface 250 using PtP interface circuits 278, 288. Processors 270, 280 may each exchange data with a chipset 290 via individual PtP interfaces 252, 254 using point to point interface circuits 276, 294, 286, 298. In one embodiment, the processors 270 and 280 would have multiple processor cores. 274, 275 and 284, 285 respectively. However, the claimed subject matter is not limited to each processor having two processor cores. The embodiment of two processor cores is merely one example and one skilled in the art appreciates utilizing a different number of processor cores for each processor based at least in part on the die size requirements, processing specifications, power limitations, etc.

Chipset 290 may also exchange data with a high-performance graphics circuit 238 via a high-performance graphics interface 239.

At least one embodiment of the invention may be located within the PtP interface circuits within each of the PtP bus agents of FIG. 2. Other embodiments of the invention, however, may exist in other circuits, logic units, or devices within the system of FIG. 2. Furthermore, other embodiments of the invention may be distributed throughout several circuits, logic units, or devices illustrated in FIG. 2.

The disclosed message protocol defines a set of allowed messages between coherence (cache and home) agents (memory controllers, processors, etc) These messages are bound to transaction phases and classified according to their classes as defined by the coherence protocol and are designed to convey coherence actions between coherence agents to form a part of the coherence protocol. A coherence protocol uses the messages as words and grammar in an algorithm to express a coherent thought. This algorithm sensibly orders requests, resolves conflicts, and describes interactions between caching agents.

The disclosed MESSAGING PROTOCOL has three protocol classes, which means that the minimum number of virtual channels that a link layer provides. The three protocol classes in MESSAGING PROTOCOL are Probes, Acknowledgments (Acks), and Responses. In one embodiment, The Probe channel has dependence on the Ack and Response channels. Thus, the probes may be blocked until Ack and Response resources become available. Both Ack and Response channels are guaranteed resources through pre-allocation and allocation. Home resources for the Ack channel are preallocated for requests that may arrive, while response resources are guaranteed either through the initial allocation of the request at the cache agent or through draining into the memory endpoint at the home.

The following definitions will facilitate explanation of the messaging protocol:

Implicit Forward: A 2-hop transaction, i.e., when a broadcast probe hits on a cached copy and the requestor receives his response directly.

Explicit Forward: This is when it becomes the home node's responsibility to send a RelFwd* to the current owner to direct him to deliver the line to the requestor.

True Conflictor: This is label applied to a requester relative to the current owner in the system. The peer node is a true conflictor if the current owner processed the peer node's probe before the current owner became the owner (i.e., while his request was outstanding). A peer node may be a true conflictor with respect to one owner in the system but not a true conflictor with respect to another node in the system.

False Conflictor: We use this to indicate a requestor whose probe has not yet been processed by the current owner—which generally makes it the opposite of a True Conflictor.

Owner: We use this tag to indicate the node in the system that currently has forwarding privileges for a given line. During a conflict chain, the current owner is the node that has most recently sent a DataAckCnflt.

The following is a table of common message fields that may exist in protocol messages. However, the claimed subject matter is not limited to the following message fields. One skilled in the art appreciates utilizing a subset of the following messages, alternatively, to add more message fields to the following defined set of messages.

TABLE 1

| Message Field | Allowed Values | Explanation |
| --- | --- | --- |
| Cmd | * | Command, equivalent to message name |
| Addr | CohAddrs | Coherent Cache line addresses |
| destNID | CacheNIDs | Destination NID, in every message |
| destTID | 0 to (MaxRequests−1) | Destination TID |
| reqNID | CacheNIDs | Requestor NID |
| reqTID | 0 to (MaxRequests−1) | Requestor TID Number |
| fromNID | CacheNIDs | From NID |
| fromTID | 0 to (MaxRequests−1) | From TID |
| homeNID | HomeNIDs | Home NID |
| Data | DataValues | A cache line's worth of data |

An explanation on each acronym in the message fields: An agent is referenced by its respective nodeid (NID); a transaction id (TID) is a label on a particular transaction leaving an agent; each message has a global unique transaction id (UTID).

Probe Channel Messages

Probe messages are listed in Table 2. In one embodiment, the probe messages travel on their own unordered virtual channel and are targeted at a caching agent (peer nodes). In one aspect, they can be considered snoops or retargeted requests.

TABLE 2

| Message Name | Function | Fields |
| --- | --- | --- |
| ReadProbe | Request a read-only or read/write copy | cmd, addr, destNID, reqNID, reqTID |
| ReadSharedProbe | Request a read-only copy | cmd, addr, destNID, reqNID, reqTID |
| ReadModProbe | Request a read/write copy | cmd, addr, destNID, reqNID, reqTID |
| InvaltoDirtyProbe | Request write permission without data | cmd, addr, destNID, reqNID, reqTID |
| SharedtoDirtyProbe | Request to upgrade a read-only copy to a read/writecopy | cmd, addr, destNID, reqNID, reqTID |
| FetchProbe | Request an invalid copy | cmd, addr, destNID, reqNID, reqTID |

In one embodiment, acknowledgment channel messages travel on an in-order acknowledgment channel, such that this channel is only architecturally required to be kept in-order to a given address, and only from the source to the destination (the destination is the home node). However, the claimed subject matter is not limited to the previous embodiment since a particular design may chose to be stricter in the order maintained (i.e., maintain order across addresses, as well), for implementation reasons.

In one embodiment, the Req2Home messages (listed in Table 3) travel on the ordered Ack channel. When the requester broadcasts, he sends probe messages to all of the peer nodes and a Req2Home message to the home node. The Req2Home message implies probe of the home node's caching hierarchy (the Probe is split off from the Req2Home message once it reaches the home node to preserve link bandwidth).

TABLE 3

| Message Name | Function | Fields |
| --- | --- | --- |
| ReadReq2Home | Request a read-only or read/write copy | cmd, addr, destNID, reqNID, reqTID |
| ReadSharedReq2Home | Request a read-only copy | cmd, addr, destNID, reqNID, reqTID |
| ReadModReq2Home | Request a read/write copy | cmd, addr, destNID, reqNID, reqTID |
| InvaltoDirtyReq2Home | Request write permission without data | cmd, addr, destNID, reqNID, reqTID |
| SharedtoDirtyReq2Home | Request to upgrade a read-only copy to a read/write copy | cmd, addr, destNID, reqNID, reqTID |
| FetchReq2Home | Request an invalid copy | cmd, addr, destNID, reqNID, reqTID |

The VicMark message (listed in Table 4) also travels on the ordered Ack channel towards the home node. There is an accompanying Victim data message on the response channel.

TABLE 4

| Message Name | Function | Fields |
|---|---|---|
| VicMark | Downgrade from M->I (data in separate msg) | cmd, addr, destNID, reqNID, reqTID |

Every probe causes a probe response (Table 5) to be generated on the acknowledgment channel, always sent to the home node. VicAck is also accompanied with a data message on the response channel.

TABLE 5

| Message Name | Function | Fields |
|---|---|---|
| InvalAck | Peer node no longer has the line | cmd, addr, destNID, reqNID, reqTID, fromNID |
| SharedAck | Peer node has a shared copy of the line | cmd, addr, destNID, reqNID, reqTID, fromNID |
| CnfltAck | Has an outstanding request for same line | cmd, addr, destNID, reqNID, reqTID, fromNID |
| FwdAck | Peer node provided the block to requestor | cmd, addr, destNID, reqNID, reqTID, fromNID |
| VicAck | Peer node provided the block to requestor with a writeback to the home node. The data is in a separate Response message | cmd, addr, destNID, reqNID, reqTID, fromNID |

Response acknowledgements messages (travel on the acknowledgment channel and listed in Table 6) are used to indicate arrival of a response message. They also push in earlier Ack channel messages like CnfltAcks, which is required to resolve some cases. For example, on a ReadMod request, the requester will wait for the Block response and the Rel message. As with all Ack channel messages, they are targeted to the home node.

TABLE 6

| Message Name | Function | Fields |
|---|---|---|
| DataAck | Received request responses & Rel. No conflict observed. | cmd, addr, destNID, reqNID, reqTID |
| DataAckCnflt | Received request responses & Rel[Cnflt]. Observed a conflict by either a probe or a RelCnflt | cmd, addr, destNID, reqNID, reqTID |
| DataAckVic | Received Blk*Vic message indicating an in-flight Victim to the home node | cmd, addr, destNID, reqNID, reqTID |
| DataAckCnfltVic | Equivalent to the prior two together-received a Blk*Vic AND observed a conflict | cmd, addr, destNID, reqNID, reqTID |
| Failure | Received a Shared2DirtyProb but the block had invalidated since the request launched | cmd, addr, destNID, reqNID, reqTID |

Response Channel Messages

The response channel carries data or non-data responses to the requestor, or victim data to the home. It is an unordered channel. Table 7 lists data responses that travel on the response channel that carry a block response (blk) with some other control information. They are targeted to the requestor. All the Blk messages can be sent either by the home on memory responses or by the cache agent on cache hits.

TABLE 7

| Message Name | Function | Fields |
|---|---|---|
| BlkForw | Block in F state | cmd, destNID, reqTID, data |
| BlkInval | Block in I state in response to Fetch | cmd, destNID, reqTID, data |
| BlkExcl | Block in E state | cmd, destNID, reqTID, data |
| BlkMod | Block in M state | cmd, destNID, reqTID, data |
| BlkForwVic | Block in F state, writeback to home | cmd, destNID, reqTID, data |
| BlkInvalVic | Block in I state, writeback to home | cmd, destNID, reqTID, data |
| BlkExclVic | Block in E state, writeback to home | cmd, destNID, reqTID, data |

The Victim message (table 8) is sent by the cache agent either in an explicit writeback along with a VicMark or as a result of a probe along with a VicAck message on the response channel.

TABLE 8

| Message Name | Function | Fields |
|---|---|---|
| Victim | Writeback to home | cmd, destNID, reqTID, data |

The messages in table 9 are similar to block responses in that they are the response to a request and they always go to the requester, but they contain no data. They are used for InvaltoDirty and SharedtoDirty requests exclusively.

TABLE 9

| Message Name | Function | Fields |
|---|---|---|
| InvaltoDirtyResp | Ownership grant | cmd, destNID, reqTID |
| SharedtoDirtyProb | Ownership grant, may fail | cmd, destNID, reqTID |

These release messages are sent to the requester on the response channel and indicate one of two things. First, a Rel or a RelCnflt is used to indicate the receipt of all probe response from peer nodes and to convey the home conflict status to the requester. A second Rel or RelFwd* is used to indicate the release of the request at the home node and to convey explicit forwarding information. The requestor may or may not release his allocated resources for the request depending on conflict information.

TABLE 10

| Message Name | Function | Fields |
|---|---|---|
| Rel | All probe responses gathered, no conflict | cmd, destNID, reqTID |
| RelCnflt | Same as a Rel, but a conflict was seen | cmd, destNID, reqTID |
| RelFwdE | Send block to requestor in E or M, inval | cmd, destNID, reqTID, reqNID, destTID |
| RelFwdF | Send block to requestor in F, keep S copy | cmd, destNID, reqTID, reqNID, destTID |
| RelFwdFI | Send block to requestor in F, inval local | cmd, destNID, reqTID, reqNID, destTID |
| RelFwdI | Send block to requestor in I, keep local | cmd, destNID, reqTID, reqNID, destTID |

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    sending a probe message from a requesting caching agent to a peer caching agent of a plurality of peer caching agents on a first virtual channel, wherein the requesting caching agent and the peer caching agent are of a plurality of caching agents that communicate via at least three virtual channels provided by a link layer of a network fabric that couples the caching agents to the at least three virtual channels including the first virtual channel to support a probe message class, a second virtual channel to support an acknowledgment message class, and a third virtual channel to support a response message class; and
    sending a request message corresponding to the probe message from the requesting caching agent to a home agent on the second virtual channel.

2. The method of claim 1, wherein the first virtual channel is dependent on the second and third virtual channels such that probe messages may be blocked until the second and third virtual channels become available.

3. The method of claim 1, wherein the plurality of caching agents are coupled via the network fabric.

4. The method of claim 3, wherein the network fabric adheres to a layered protocol scheme.

5. The method of claim 4, wherein the layered protocol scheme comprises at least one of a link layer, a protocol layer, a routing layer, a transport layer, and a physical layer.

6. A system to support a cache coherence protocol for a plurality of caching agents comprising:
    a processor including:
        a link layer to support a first virtual channel for a probe message class, a second virtual channel for an acknowledgment message class, and a third virtual channel for a response message class, wherein the probe message class is to travel on the first virtual channel and is targeted at a peer node caching agent, and the acknowledgment message class is to travel on the second virtual channel and is targeted to a home node caching agent, wherein at least one acknowledgement message of the acknowledgement message class is to imply a probe of a cache hierarchy of the home node caching agent.

7. The system of claim 6, wherein the response message class is to travel on the third virtual channel and carry data or non-data responses to a requestor or victim data to the home node caching agent.

8. The system of claim 6, wherein the first virtual channel is an unordered virtual channel.

9. The system of claim 6, wherein probe messages of the probe message class are to cause a probe response to be generated on the second virtual channel dedicated to acknowledgment messages to be sent to the home node caching agent.

10. The system of claim 6, wherein the second virtual channel is an in-order acknowledgment channel, and wherein acknowledgement messages of the acknowledgement message class are to be maintained in-order for a given address from a source to the home node caching agent.

11. A system comprising:
    a dynamic random access memory (DRAM);
    a processor coupled to the DRAM and having communication links to a network fabric of a plurality of caching agents that support at least three virtual channels, including a first virtual channel that supports a probe message class, a second virtual channel that supports an acknowledgment message class, and a third virtual channel that supports a response message class, and wherein the first virtual channel is dependent on the second and third virtual channels such that probe messages may be blocked until the second and third virtual channels become available; and a home node caching agent coupled to the processor to determine a winner of a conflict for an address among at least two of the plurality of caching agents, the home node caching agent to receive at least one acknowledgement message of the acknowledgement message class that is to imply a probe of a cache hierarchy of the home node caching agent.

12. The system of claim 11, wherein the network fabric supports a layered protocol scheme.

13. The system of claim 11, wherein the processor includes a plurality of cores.

14. The system of claim 11, wherein a probe message is to be split off from the at least one acknowledgement message when the at least one acknowledgement message is received by the home node caching agent.

15. The system of claim 14, wherein the probe message is to cause a probe response to be sent to the home node caching agent on the second virtual channel.

16. The system of claim 14, wherein the probe message comprises a request for a copy of data.

17. The system of claim 14, wherein the probe message comprises a request for a write permission without data.

18. The system of claim 14, wherein the probe message comprises a request to update a read-only copy of data to a read/write copy of the data.

19. The system of claim 14, wherein the probe message comprises a request for an invalid copy of data.

* * * * *